US008458019B2

(12) United States Patent
Sergiades

(10) Patent No.: US 8,458,019 B2
(45) Date of Patent: Jun. 4, 2013

(54) METHOD AND SYSTEM FOR DISPLAYING DISCOUNT INFORMATION

(76) Inventor: Russell Sergiades, Toronto (CA)

( * ) Notice: Subject to any disclaimer, the term of this patent is extended or adjusted under 35 U.S.C. 154(b) by 1430 days.

(21) Appl. No.: 12/040,948

(22) Filed: Mar. 3, 2008

(65) Prior Publication Data

US 2009/0222337 A1 Sep. 3, 2009

(51) Int. Cl.
*G06Q 30/0207* (2006.01)
*G06Q 30/02* (2006.01)
(52) U.S. Cl.
CPC .................................. *G06Q 30/0207* (2013.01)
USPC ...................... 705/14.1; 705/14.39; 705/14.51
(58) Field of Classification Search
CPC ................................................. G06Q 30/0207
USPC .................. 705/14, 1, 10, 14.1, 14.51, 14.39
See application file for complete search history.

(56) References Cited

U.S. PATENT DOCUMENTS

| | | | | |
|---|---|---|---|---|
| 5,361,871 A | * | 11/1994 | Gupta et al. | 186/61 |
| 5,774,870 A | | 6/1998 | Storey | |
| 5,787,402 A | | 7/1998 | Potter et al. | |
| 5,926,817 A | | 7/1999 | Christeson et al. | |
| 6,078,897 A | | 6/2000 | Rubin et al. | |
| 6,292,786 B1 | | 9/2001 | Deaton et al. | |
| 6,415,261 B1 | | 7/2002 | Cybul et al. | |
| 6,516,302 B1 | | 2/2003 | Deaton et al. | |
| 6,520,412 B1 | | 2/2003 | Umeta | |
| 6,611,811 B1 | * | 8/2003 | Deaton et al. | 705/14.39 |
| 6,687,679 B1 | | 2/2004 | Van Luchene et al. | |
| 6,735,569 B1 | | 5/2004 | Wizig | |
| 6,803,926 B1 | | 10/2004 | Lamb et al. | |
| 6,847,936 B2 | | 1/2005 | Fang | |
| 6,885,996 B2 | | 4/2005 | Nicholson | |
| 6,922,676 B2 | | 7/2005 | Alnwick | |
| 7,107,226 B1 | * | 9/2006 | Cassidy et al. | 705/26.8 |
| 7,194,423 B2 | | 3/2007 | Walker et al. | |
| 7,231,357 B1 | | 6/2007 | Shanman et al. | |
| 7,236,944 B1 | | 6/2007 | Schwartz et al. | |
| 7,240,021 B1 | | 7/2007 | Walker et al. | |
| 2002/0169661 A1 | * | 11/2002 | Demsky et al. | 705/14 |
| 2003/0074278 A1 | * | 4/2003 | Keohane et al. | 705/27 |
| 2003/0130898 A1 | * | 7/2003 | Pickover et al. | 705/26 |
| 2003/0132298 A1 | | 7/2003 | Swartz et al. | |
| 2003/0225630 A1 | * | 12/2003 | Kakuta | 705/26 |
| 2004/0117261 A1 | | 6/2004 | Walker et al. | |
| 2005/0055273 A1 | | 3/2005 | Phillips et al. | |
| 2006/0085252 A1 | * | 4/2006 | Kersenbrock | 705/14 |
| 2007/0011044 A1 | * | 1/2007 | Hansen | 705/14 |
| 2007/0055568 A1 | | 3/2007 | Osborne | |
| 2007/0130016 A1 | | 6/2007 | Walker et al. | |

OTHER PUBLICATIONS

Editors, Business. "NASDAQ Ticker Symbols Now Available for BlackRock's Closed-End Funds." Business Wire: 1. May 29, 2003. Business Dateline; Hoover's Company Profiles; ProQuest Central.*
Estrada, Sheryl. "Online Booksellers." Black Issues Book Review 2002: 19-. Hoover's Company Profiles; ProQuest Central. Web.*
M, P. Mart, et al. "Evaluating Temporary Retail Price Discounts using Semiparametric Regression." The Journal of Product and Brand Management 15.1 (2006): 73-80. Hoover's Company Profiles; ProQuest Central.*

* cited by examiner

*Primary Examiner* — Sarah Monfeldt
*Assistant Examiner* — Abhishek Vyas
(74) *Attorney, Agent, or Firm* — Bereskin & Parr LLP/S.E.N.C.R.L., s.r.l.

(57) ABSTRACT

A system and method for using a discount display system are provided in which a plurality of purchase option screens are displayed to a user. For each discount-eligible item identifier selected by the user, the price of the item is added to the user's total, the current discount available to the user is re-calculated and the updated discount is displayed to the user.

20 Claims, 6 Drawing Sheets

METHOD AND SYSTEM FOR DISPLAYING DISCOUNT INFORMATION

TECHNICAL FIELD

The present invention relates generally to computer software and more specifically to computer software for displaying discount information for corresponding goods and/or services.

BACKGROUND

Use of the Internet to access and shop at online retailers, wholesalers or manufacturers is becoming increasingly popular. Typically, online vendors will use a plurality of webpages to display their goods and services, as well as process payment transactions. The webpages of an online retailer may be classified in two broad categories; i) static webpages that merely display information to a user, and ii) interactive webpages that allow a user to select items for purchase.

Online retail webpages typically consist of a combination of text and graphical information displayed to a user. E-commerce websites also typically include a plurality of item identifiers. The item identifiers are visual features on the vendor's webpage that represent tangible goods and services that are available for purchase.

In addition to conventional webpages, online vendors may also utilize other technologies and interfaces that enable the desired e-commerce transactions. These alternative technologies may or may not be web-based. An example of a webpage alternative is an ecommerce system designed to operate on mobile phone networks. Using such a system, a mobile phone owner may be able to shop for goods and services using only her phone's operating system, without the need for a traditional computer and internet browser. E-commerce transactions may be conducted using mobile phones, PDAs and a variety of other electronic devices operating with non-browser-based web interfaces.

While the development of online selling may be relatively new, product discounts and other similar purchase incentives have long been used to promote the sale of goods and services. Products are typically discounted as an attempt to encourage consumers to purchase additional goods and services that the consumers may be less likely to purchase if the goods and services were offered at full price. Product discounts can be offered as a percentage of the price of the good (i.e. "This t-shirt is 50% off"), or the discount may be expressed as a dollar value (i.e. "This t-shirt is $5.00 off").

Discounts off regularly priced products have traditionally been offered for a variety of reasons. For example, a product may be discounted because it is out of season, damaged or going out of style. Products may also be discounted if they become obsolete, or a competing product is introduced into the market place.

However, using the discount display systems currently known in the art, a customer's discount information shown on a given interactive webpage can become at least temporarily hidden from the customer's view when the webpage changes to a different interactive webpage. In addition, current discount display systems do not display an updated discount amount to a customer in real-time. In fact, current discount display systems commonly do not display an updated discount amount to a customer until the customer proceeds to the online check out at the conclusion of the shopping transaction. By the time a customer has reached the online check out, the chances of that customer re-entering the online retailers interactive webpages to purchase additional goods is greatly reduced.

When a customer's discount information is hidden from view (even temporarily) or is not promptly updated, she may not realize how each additional item selected affects her discount amount, and she may therefore be less likely to purchase additional items. Having a customer's current discount information disappear from view is particularly disadvantageous when the customer is accessing additional interactive webpages and considering making additional purchases.

Therefore, there is a need for a discount display system that can display a customer's current, updated discount information continuously for as long as the customer is accessing an online retailer's interactive webpages. It would be advantageous for the current, updated discount information to be displayed on each interactive webpage accessed by the customer. It may also be advantageous for the discount display system to display the current, updated discount information on a plurality of the online retailer's static webpages. The discount display system described herein addresses these needs.

SUMMARY

In accordance with an aspect of an embodiment of the invention, there is provided a system for calculating and displaying a current discount to a user and based on the user's selection of discount-eligible item identifiers, representing a plurality of discount-eligible items available for purchase. The system comprising a memory for configuring a processor to display a plurality of screens and to change between the screens. The plurality of screens comprises a plurality of purchase option screens that include user input windows operable to allow a user to select an associated discount-eligible item identifier for purchase. The system further comprising a price determination module for determining a price associated with each of the at least one discount-eligible item identifiers selected for purchase. The system also comprises a discount calculation module to calculate, and re-calculate the current discount based on the price associated with each of the discount-eligible item identifiers selected or unselected by the user. The system further comprises a discount display for displaying the current discount to the user.

The system may be configured to re-calculate the current discount and display the current discount to the user before the display screen is changed or within five seconds of the discount-eligible item identifier being selected.

The system may also comprise a mode control module for changing the system from an active mode to an inactive mode and vice-versa. The mode control module may also be configured to change an individual item identifier from a discount-eligible item identifier to a discount-ineligible item identifier, or vice-versa.

In accordance with an aspect of an embodiment of the invention, there is provided a method of using a discount display system in which a plurality of purchase option screens are displayed to a user. The purchase option screens may contain a plurality of discount-eligible item identifiers and plurality of discount-ineligible item identifiers. For each discount-eligible item identifier selected by the user, the price of the item is added to the user's total, the current discount available to the user is re-calculated and the updated discount is displayed to the user.

BRIEF DESCRIPTION OF THE FIGURES

For a better understanding of the embodiments described herein and to show more clearly how they may be carried into effect, reference will now be made, by way of example only, to the accompanying drawings which show at least one exemplary embodiment, and in which.

Figure 1:
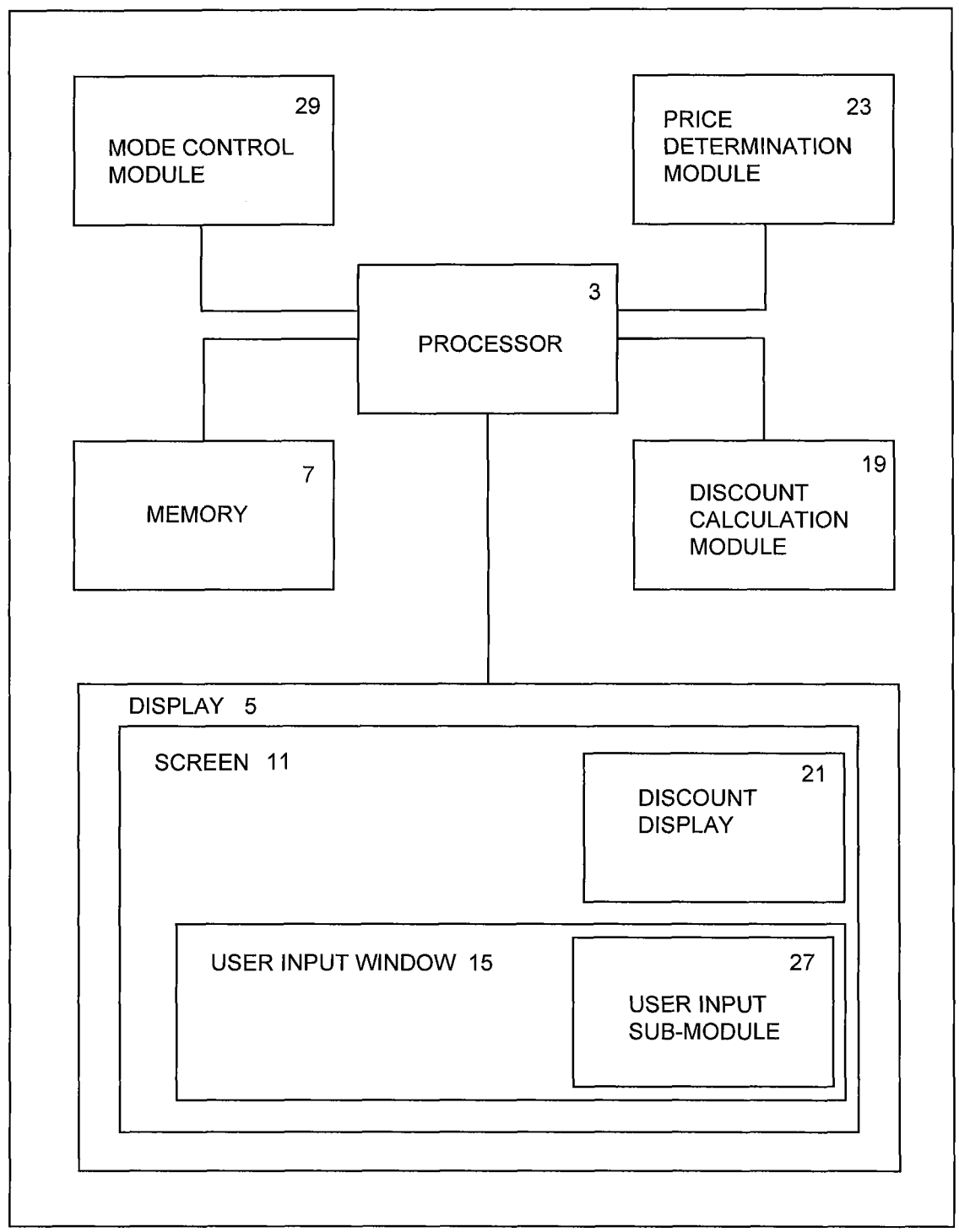
FIG. 1 is an exemplary block diagram showing several major components of a discount display system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

FIG. 1 illustrates exemplary aspects of an embodiment of the discount display system 1. The discount display system 1 comprises a processor 3 in communication with a display 5, a plurality of screens 11 that can be shown on the display 5, and a discount display 21 that can display a current discount value to a user. The screens 11 can include a user input window 15 and a user input sub-module 27 that are in communication with the processor 3 and that allow a user to interact with the system. While shown with one processor 3, the discount display system 1 may comprise a plurality of processors.

The discount display system 1 can also comprise software modules stored in a memory 7 and executed by the processor 3. The memory may be any volatile or non-volatile type known in the art. As shown in FIGS. 1 through 4, the discount display system 1 may also comprise a price determination module 23, a mode control module 29 and a discount calculation module 19 that are communicably linked via the processor 3. The memory 7 may also be configured to store a variety of other information required for a given embodiment of the discount display system 1, including additional software modules and databases.

The display 5, as shown in FIG. 1, displays information to a user. The display 5 can be any type of display apparatus that is commonly used to transmit information to a user. The discount display system 1 may comprise a single display 5 or a plurality of separate displays 5. For the illustrative purpose of this description, the display 5 is understood to describe a computer monitor. The system display 5 can display information to the user in the form of a plurality of screens 11. Each screen 11 in the discount display system 1 may comprise a variety of information.

For example, each screen 11 displayed by the discount display system 1 can include text information, graphics, pictures, animations, videos or hyperlinks. The type of information included on each screen 11 of the plurality of screens 11 of the discount display system 1 is configurable by a system operator. An example of a discount display system screen 11 is an internet webpage displayed to a user on the system display 5. The discount display system 1 may also be configured to display the plurality of screens 11 on a plurality of displays 5. For example, the display 5 of the discount display system 1 may comprise a main display monitor and a separate discount display monitor (not shown). The discount display system 1 could then be configured to display product information on the main display monitor while simultaneously displaying current discount information on the separate discount display monitor.

Figure 3:
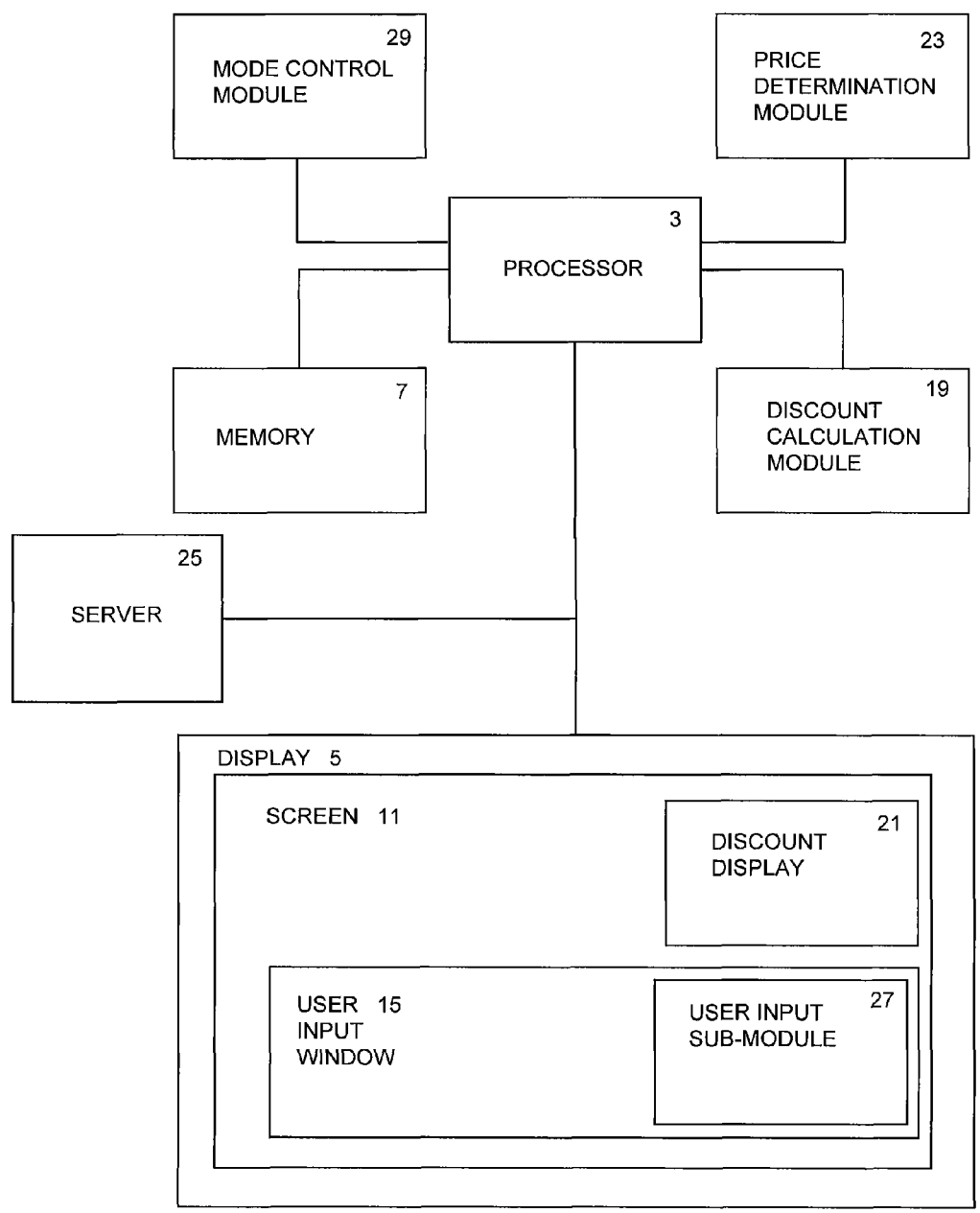
FIG. 3 is an exemplary block diagram illustrating an alternate embodiment of the discount display system shown in FIG. 1.

FIG. 3 shows an embodiment of the discount display system 1 that includes a server 25 in communication with the processor 3 and the display 5. The server 25 may house the elements of the discount display system 1, and may also house the hardware and software necessary to operate an online shopping website. The server 25 may be any type of server hardware and software known to those skilled in the art. The discount display system 1 may be configured such that the server 25 may be located in a geographically remote location from the display 5. This remote configuration may be used when the display 5 is a computer monitor located at a user's home and the server 25 is located at the vendor's warehouse or operations centre. Alternatively, the discount display system 1 may also be configured such that the server 25 and the display 5 are located at the same geographic location. While FIG. 3 shows a system comprising a single server 25, the discount display system 1 may comprise a plurality of servers 25. The plurality of servers 25 may be located at a common location, or they may be located at a plurality of geographically separate locations.

If the discount display system 1 is not installed within the same server as the operating system of the shopping website, it may be communicably linked with the server that hosts the website as is shown in FIG. 3. The modules of the discount display system 1 can be contained within a single housing, as shown in FIG. 1, or can be located in a variety of physical locations in communication with each other, as shown in FIG. 3. Portions of the system could be installed at the location of each user, or preferably the discount display system 1 could be installed in a single location that is communicably linked with a plurality of displays 5 in different locations.

In the exemplary embodiment of the discount display system 1, the screens 11 are the webpages of an online shopping website. The pages of an online shopping website can be classified into two broad categories; pages that merely display information to a user (static pages) and pages that allow a user to make purchases from the website. In the exemplary embodiment of the discount display system 1, pages that allow a user to select items for purchase from the website will be referred to as purchase option screens.

Figure 2:
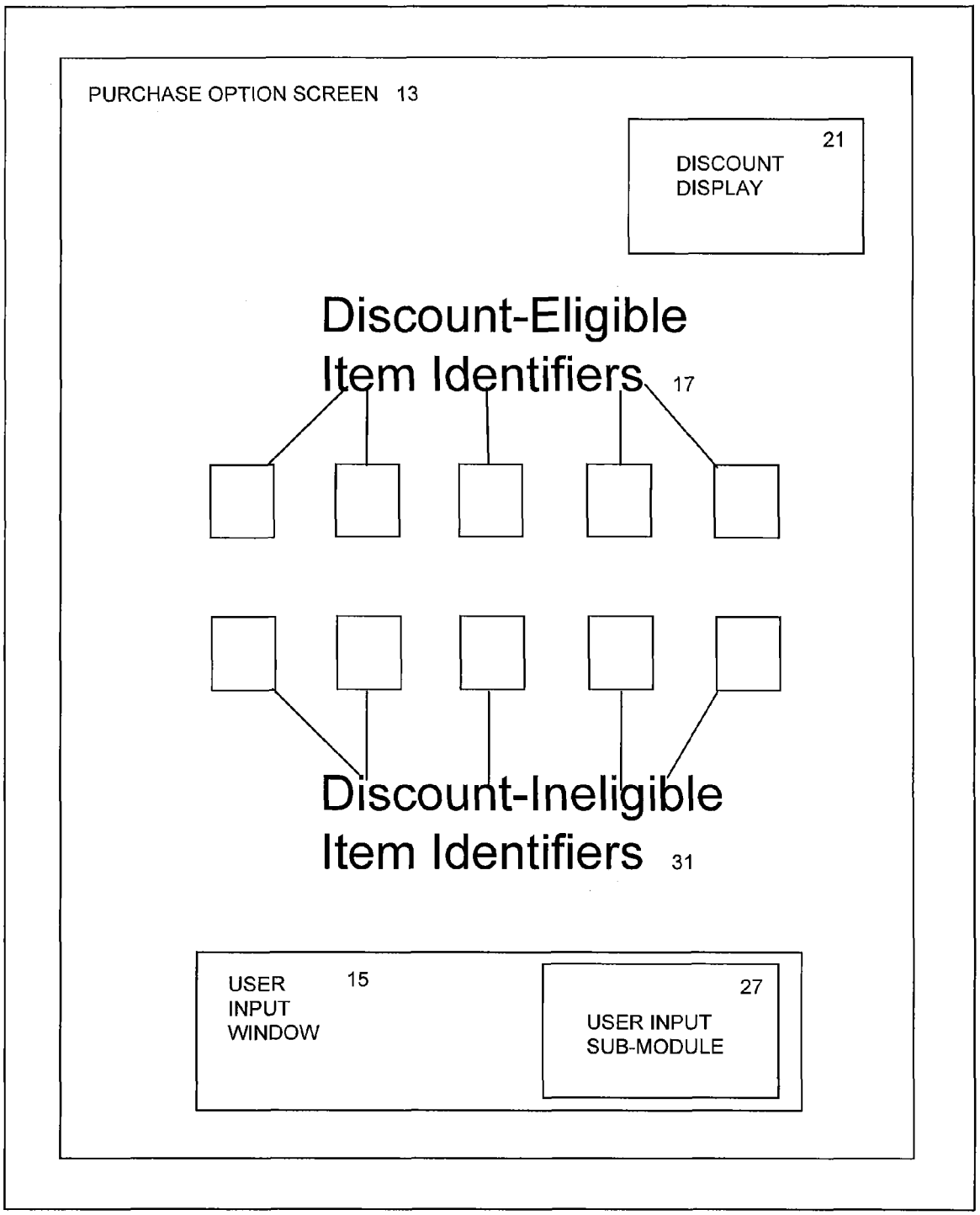
FIG. 2 is an exemplary block diagram showing several major components of a purchase option screen for use in the system shown in FIG. 1.

FIG. 2 shows an example of a purchase option screen 13 that can be displayed as one of the plurality of screens 11 of the discount display system 1. The purchase option screen 13 includes a user input window 15 that may contain a user input sub-module 27. The purchase option screen 13 also includes a plurality of item identifiers 17, 31. The item identifiers 17 and 31 are display symbols, displayed on the system display 5, that correspond to tangible products that are available for sale through the online shopping website. The screens 11 and the purchase option screens 13 may also be configured to be accessed from mobile phones, PDAs and other non-browser-based web interfaces.

If it is desired that the purchase of a given item can have an impact on the amount of a discount offered to a user, the item can be represented by a discount-eligible item identifier 17. If, however, the purchase of a given item is not intended to influence the discount offered to the user, the item can be represented by a discount-ineligible item identifier 31. The embodiment of the discount display system 1 shown in FIG. 2 includes both discount-eligible item identifiers 17 and discount-ineligible item identifiers 31 on its purchase option screen 13. However, there may be some embodiments of the discount display system 1 where only discount-eligible item identifiers 17 are included in a purchase option screen 13 or alternatively where only discount-ineligible item identifiers 31 are included in a purchase option screen 13. The number and type (discount-eligible vs discount-ineligible) of item identifiers shown on a purchase option screen 13 can be chosen by a system operator, supplied by an external, third-party source (a webpage, a server, etc) or determined automatically by the mode control module 29.

In the exemplary embodiment of the discount display system 1 shown in FIG. 1, the price determination module 23 can distinguish between the selection of discount-eligible identifiers 17 and discount-ineligible item identifiers 31. The prices of all the selected item identifiers 17 and 31 can be used in the determination of the total check-out price owed by the user, but only the prices of the discount-eligible item identifiers 17 are sent to the discount calculation module 19. The status of a given item identifier can be changed during the operation of the discount display system 1.

A system operator can manually change the status of a product's item identifier or the it can be automatically changed by the mode control module 29 of the discount display system 1 in response to a change in a system value. For example, the mode control module 29 of the discount display system 1 may be operable to monitor the inventory levels of several products offered for sale. Consider a shopping website that sells glassware. The website may initially offer coffee mugs for sale at regular price by placing a discount-ineligible item identifier 31 on one of the website's purchase option screens 13. Any user selections of the coffee mug's discount-ineligible item identifier 31 would form a part of the user's total check-out price, but would not be sent to the discount calculation module 19 and would not alter the user's current discount. However, if the inventory level of coffee mugs exceeded a pre-determined upper threshold, say 100 mugs in stock, then the mode control module 29 could automatically convert the discount-ineligible item identifier 31 to a discount-eligible item identifier 17. Any user selections of the coffee mug's now discount-eligible item identifier 17 could result in the price of the mug being included in the user's check-out price as well as being sent to the discount calculation module 19. Similarly, if the stock of coffee mugs fell below a pre-determined inventory threshold, say 10 mugs in stock, the status of the coffee mugs' identifier could automatically be changed from a discount-eligible item identifier 17 to a discount-ineligible item identifier 31.

Following every selection of a discount-eligible item identifier 17 by a user, the discount calculation module 19 can re-calculate the amount of the current discount that will be given to the user. The current discount amount can then be sent to the discount display 21 and displayed to the user. The discount display system 1 can be operable to update the discount display 21 in response to the user's selection of a discount-eligible item identifier 17 within five seconds of the selection of the discount-eligible item identifier 17. Ideally, the discount display 21 is updated and displayed before the screen 11 changes from the purchase option screen 13 to another screen 11. By quickly displaying an increase in the discount amount, the discount display system 1 can provide real-time feedback to the user. After every selection of a discount-eligible item identifier 17, the amount of the current discount may increase and the increased discount can be displayed to the user. As the amount of the discount increases, the user may be encouraged to select additional items for purchase. In an embodiment of the discount display system 1, the discount display 21 is updated before the user changes the display 5 from the purchase option screen 13 to another screen 11. If the updated discount is displayed to the user before she changes from the purchase option screen 13, she may be more likely to select additional items for purchase, which can increase the revenue of the online shopping website.

In an embodiment of the discount display system 1 where the system can automatically change the status of an item identifier (from discount-eligible to discount-ineligible, or vice-versa), the system may be configured to monitor at least one system value and at least one item status trigger. In the coffee mug example above, the system value monitored by the mode control module 29 was the inventory level of the coffee mugs. The status of a product item identifier could also be automatically changed in response to a variety of other system values or combination thereof. The mode control module 29 could monitor additional system values including the time, date, quantity of the item purchased, other complimentary goods purchased or other desired system values. For each system value, the discount display system 1 may comprise one or more corresponding item status triggers. An item status trigger is a predetermined value received by the mode control module 29 that results in the item identifier of an associated item changing from a discount-ineligible item identifier 31 to a discount-eligible item identifier 17, or vice-versa. For the sake of clarity in the following description, an item status trigger is understood to be either i) an item-specific activation condition precedent (if an item identifier is changed from discount-ineligible to discount eligible), or ii) an item-specific deactivation condition precedent (if an item identifier is changed from discount-eligible to discount-ineligible). The item status trigger for a given item may be automatically generated by the discount display system 1, it may be received from an external automated system, or it may be a value input manually by a system operator. In some embodiments of the discount display system 1, an item status trigger may also be based on a combination of automated and system operator generated inputs. The nature of an item status trigger may also be based on the specific characteristics of the item associated with the trigger.

For example, the mode control module 29 could monitor the date and be configured to automatically switch all item identifiers corresponding to Halloween decorations from discount-ineligible item identifiers 31 to discount-eligible item identifiers 17 on October 1 and to switch all the identifiers back to discount-ineligible item identifiers 31 on November 1. In this example, the system value monitored was the current date, and the item status trigger for the Halloween decorations was a specific date, or threshold value that the discount display system could monitor automatically (in this case October 1 and November 1). In this example, any decoration classified as a Halloween decoration was automatically switched from a discount-ineligible item identifier 31 to a discount-eligible item identifier 17 when the discount display system 1 registered a specific threshold date related to a specific event, in this case Halloween. Time and date monitoring may be used in a variety of situations where the sales of a particular good, or class of goods, are related to a threshold time or date.

The sale of Christmas decorations may include several threshold dates monitored by the discount display system 1. For example, using the discount display system 1, Christmas decorations may be discounted in November to attract early shoppers, offered at full price between December 1 and December 24 and then discounted after December 26 to clear out inventory.

In addition to being event-specific, the item status triggers monitored by the discount display system 1 may be seasonal in nature. For example, ski equipment may be offered at full price at the beginning of the ski season (e.g. October, November and December) but it may be discounted toward the end of the ski season (e.g. January and February).

The monitoring of seasonal dates may be done automatically by the mode control module 29 based on pre-determined trigger dates, or the item status triggers may be manually activated by a system operator. A discount display system 1 may also be configured to allow both types of triggering events. In a discount display system 1 that comprises both automatic and manual system-operator-defined status triggers, the manual status triggers may take priority. For example, the mode control module 29 may contain pre-determined item status triggers for ski equipment that are set to discount all ski equipment on January 1. However, if the snowfall had been unusually heavy in a given season, the system operator may choose to override the pre-determined status trigger date and keep ski equipment at full price until a later date.

Another example of a time and date based item status trigger is the sale of time sensitive goods. A discount display system 1 may be configured to modify the discount status of a good based on the time remaining to use the good. For example, the discount display system 1 may be configured to operate on a website that sells concert tickets. The tickets for a concert may initially be offered at full price, but the value of the tickets may be discounted as the concert date approaches. Because the concert ticket has very little value after the concert has taken place, an automated discount display system 1 may be configured to change concert ticket listings from discount-ineligible item identifiers 31 to discount-eligible item identifiers 17 on the day of the concert. The discount display system 1 may also be configured to increase the amount of the discount offered over the course of the day as the concert start-time approaches. If, however, demand for the concert tickets remained strong on the day of the concert, a system operator may override the automatic discount and keep the concert tickets listed at full price.

Yet another example of an application of a time and date based item status trigger is the sale of perishable goods. The discount display system 1 may be configured to modify the discount status of a good based on the expiration date of the good. An example of a good with an expiry date is a perishable food item such as a t-bone steak. When first cut, a t-bone steak may be offered at its full retail price. However, the t-bone steak will not stay fresh permanently. When the t-bone steak approaches its expiry date, the mode control module 29 may switch the item identifier for the t-bone steak from a discount-ineligible item identifier 31 to a discount-eligible item identifier 17. In each of the examples given above, the item status trigger was a threshold time or date. However, it is understood that the mode control module 29 and the discount display system 1 may be configured to monitor additional system values other than the time and date.

In addition to monitoring the time and date as described above, the discount display system 1 and the mode control module 29 may be integrated into a variety of existing Enterprise Resource Planning (ERP) systems which allows the mode control module 29 to monitor a plurality of business specific system values and item status triggers. For the purpose of the following examples, an ERP system is understood to describe any system used to integrate the data and processes of an organization into a unified system. An ERP system may comprise a plurality of software and hardware modules working together to achieve the desired level of integration. A common feature of most ERP systems is a unified database that stores relevant enterprise data that can be accessed by a variety of the hardware and software system modules. For example, an ERP system may track sales, inventory, purchasing, operating expenses, production totals, payroll, accounts receivable, research and development projects and any number of additional, business-specific data.

If the discount display system 1 is configured to be integrated with an ERP system, the system values monitored by the mode control module 29 may be any of the enterprise data tracked by the ERP system. The item status triggers of the discount display system 1 can then be any threshold value associated with the system value being monitored. For example, a discount display system 1 configured to interact with an ERP system may be configured to monitor a variety of financial ratios calculated by the ERP system. Examples of financial ratios include Activity Ratios and Profit Ratios. For the purposes of illustration, an example describing a particular type of activity ratio, the Inventory Turn Ratio (also known as the Inventory Turnover Ratio), is outlined below.

The inventory turn ratio is a ratio that can used to measure how many times the inventory of a given item "turns over" (i.e. is sold) during a given time period. The higher the inventory turn ratio, the more frequently an item has sold. The inventory turn ratio is commonly expressed as a number of turns per year. In general, if a product is popular it may have a high inventory turn ratio, whereas if a product is not selling well it may have a low inventory turn ratio. Items sold, and items kept in inventory, may be tracked using stock-keeping units (SKUs), product classes, model name, model number, supplier information, manufacturer information, or any other item characteristic.

For example, an online hardware retailer may stock a variety of doorknob products. Items available for sale may include interior glass doorknobs, interior porcelain doorknobs and exterior brass locking doorknobs. Each type of doorknob may be identified by SKU, supplier and class. Over the course of a year, the sale of each type of doorknob may be monitored by an ERP system or a system operator. It may be determined that the inventory turn ratio for the porcelain and brass doorknobs is in the desired range, but that the inventory turn ratio for glass doorknobs is low and has been decreasing (commonly referred to as slowing or dead inventory turn ratio). A discount display system 1 used by the online hardware retailer may be configured to monitor the inventory turn ratio data provided by the ERP system, and the mode control module 29 made be configured to change the status of items that have low inventory turn ratios. In this example, the item status trigger for the glass doorknobs could be an inventory turn ratio value that passes a pre-determined low threshold. When the inventory turn ratio threshold value is crossed, the mode control module 29 may change the item identifiers for glass doorknobs from discount-ineligible item identifiers 31 to discount-eligible item identifiers 17 in an attempt to increase sales of glass doorknobs.

In another example, the data obtained from a system operator or an ERP system may indicate that all classes of doorknobs sold equally well, but that the doorknobs manufactured by a given supplier were consistently the worst selling doorknobs in each class. The relative performance of a given brand of product may also serve as an item status trigger. Based on that information, the mode control module 29 may be configured to change the item status of all doorknobs made by the given supplier from discount-ineligible item identifiers 31 to discount-eligible item identifiers 17.

In addition to tracking the sales of a given class of doorknob against other classes of doorknobs, the system operator or ERP system may also be configured to track the sales of a given class of doorknob across different locations. For example, glass doorknobs may have poor sales in Canada but they may have high sales in Europe. In this case, the item status trigger may be the regional sales performance of the product. Using this information, the discount display system 1 and the mode control module 29 may be configured to list glass doorknobs using discount-eligible item identifiers 17 when the hardware website is accessed from Canada, but to list glass doorknobs using discount-ineligible item identifiers 31 when the hardware website is accessed from Europe.

While the preceding examples were based on the calculation of the inventory turn ratio, it is understood that the item status triggers of a discount display system 1 could be configured to operate with the outputs from a variety of desired financial ratios. A system operator could determine the precise system value tracked for a given financial ratio, and the associated item status trigger values could also be pre-determined by the system operator. During operation of an online business, the financial ratio outputs may be determined in any manner known to those skilled in the art (e.g. manually by a system operator, automatically by an ERP system, etc.). Once determined, the financial ratio outputs may be used as inputs for the discount display system 1 and the mode control module 29 where they will be compared to the item status trigger values.

In another embodiment of the discount display system 1, the system values to be monitored, and the item status triggers associated therewith, may be based on other extrinsic factors that may have an impact on the sales of a given product. Broadly speaking, the discount display system 1 may be configured to react to a variety of social, technological, ecological, political and economic system values and the associated item status triggers. The following examples are included to illustrate this concept.

Some industries are more sensitive than others to social changes and new popular trends. A screw manufacturer may not see its sales fluctuate in response to the new fashion trends, but an online clothing retailer may be greatly affected. In an embodiment of the discount display system 1, the mode control module 29 may be configured to monitor a system value that relates to fashion trends. Specifically, the system may be configured to display "cool" or popular clothing items using a discount-ineligible item identifier 31 and to display "uncool" or unpopular clothing items using a discount-eligible item identifier 17. The item status trigger relating to fashion trends may be a "coolness" rating assigned to each garment. If the "coolness" rating of a garment falls below a pre-determined "coolness" threshold, the mode control module 29 may change the garment's discount-ineligible item identifier 31 to discount-eligible item identifier 17 in an attempt to sell the "uncool" stock. Because "coolness" or trendiness is a qualitative trait, determining the "coolness" of an article may be done by a system operator, who assigns a "coolness" score to each garment. The system operator may base this rating on a number of indicia, including recent fashion shows, fashion review articles and magazines, and observed celebrity fashion trends. However, it may also be possible for a "coolness" rating to be assigned automatically by an ERP system or other software system developed for that purpose, or even by user feedback provided by site visitors rating articles of clothing on an arbitrary "coolness" scale.

Another example of an extrinsic factor that may affect the pricing of a given product is the release of a replacement or competing product. For example, consider an online electronics retailer that sells portable CD players. At the time when CDs were the most popular music medium, the portable CD players may have been sold at full price and represented online by discount-ineligible item identifiers 31. However, in view of the rapid adoption of the MP3 music format, and the accompanying portable MP3 players, the sales of portable CD players may be affected. In response to the release of portable MP3 players, the online electronics retailer may choose to discount the price of its remaining portable CD players. In an embodiment of the discount display system 1, a system operator may be able to activate an item status trigger based on the market conditions described. In response to the release of the portable MP3 players, the system operator may configure the mode control module 29 to change the representation of the portable CD players from discount-ineligible item identifiers 31 to discount-eligible item identifiers 17. While this example describes a situation in which a system operator monitors the market conditions and activates the mode control module 29, it is understood that the release of a new or competing product may be tracked automatically by a software system operating in concert with the discount display system 1 such that the release of a new product automatically triggers a status change for an existing product or group of products.

Yet another example of an extrinsic factor that may affect the pricing of a given product is the recent social, political and ecological emphasis placed on "green" or environmentally-friendly products. In response to the current emphasis on "green" products, an online retailer may choose to discount the price of any environmentally-friendly goods that it sells. The discount display system 1 and mode control module 29 could be configured to track a "green" system value assigned to each product. The "green" value for each good may be determined manually by a system operator, or automatically by an accompanying software system that calculates a "green" rating based on a variety of input factors (such as percent recycled material used, biodegradability, amount of packaging, recyclability, etc). If the "green" rating for a given product exceeds a pre-determined threshold, it may be changed to a discount eligible product during an event such as a sales promotion period.

The preceding examples were included to illustrate the types of extrinsic factors that may influence the status of a given product. The preceding examples are not intended to be a closed set of factors. Numerous other extrinsic factors may be monitored as system values of the discount display system 1. Some additional examples of extrinsic social, technological, ecological, political, and economic factors include: resource availability, product obsolescence (2007 cars may be discounted when 2008 cars are released), economic depression, currency fluctuations, changes in labor costs, changes in production costs, and supplier incentives. For any given system value or item status trigger, the discount display system 1 can be updated manually by a system operator, automatically by the mode control module 29, or a combination thereof.

In the examples described above, the system values and item status triggers used by the discount display system 1 were independent indicia. In other words, in the clothing example described above, the status of a given clothing item could be directly affected by its "coolness" rating, without considering other factors. However, in an embodiment of the discount display system 1, the final status of any given product may be influenced by a plurality of system values having a plurality of item status triggers. The ultimate status of a product may be an aggregate of several indicia. An example of such a configuration is described below.

Consider an online website that sells airline tickets. The ultimate decision whether to offer any given airline ticket at full price or at a discounted price may depend on several factors. The discount display system 1 and the mode control module 29 may be configured to account for each factor.

One system value monitored may be the closeness to the flight time. An item status trigger may be configured to discount the ticket as the flight time approaches. An airline ticket for a Saturday flight may be full price on the Monday before the flight, but may be discounted on Friday; the day before the flight.

Another system value that may be monitored is the cost of jet fuel. If jet fuel costs remain high, the price of a ticket may remain at full price. However, if the price of jet fuel decreases, the price of a ticket may be discounted proportionally.

The discount display system 1 may also monitor the current state of political or environmental affairs in the destination country. If the political climate is steady and the weather is pleasant in the destination country, the airline ticket may remain at full price. However, if the political climate is volatile (civil war, domestic unrest, etc.) or if the weather is not desirable (flooding, hurricane, etc.) then the airline ticket may be discounted.

Other types of global events may also influence airline prices. For example, immediately following a terrorist attack, the price for airline tickets may be discounted. In contrast, in the weeks leading up to the 2010 summer Olympic Games in British Columbia, the price for airline tickets to Vancouver may remain at full price.

The mode control module 29 may be configured to monitor a plurality of system values, including those described above, that may be combined to determine if an airline ticket should be discounted or remain at full price. The combination of the system values may be a weighted average, or any other type of combination process known to those skilled in the art for combining a plurality of discrete item status trigger values into a single, representative item status trigger value. The mode control module 29 can then output the single, representative item status trigger value thereby changing the airline ticket item identifier from a discount-ineligible item identifier 31 to a discount-eligible item identifier 17, or vice-versa, as desired. For example, the mode control module 29 may be configured to discount an airline ticket for a Saturday flight because it was bought on the Friday before and there is currently a hurricane in the destination country, despite the fact that fuel costs have increased, the political climate is stable and a major sporting event is taking place in the destination city.

In another embodiment of the discount display system 1, the system value monitored by the mode control module 29 may be the identity of a customer who accesses the online shopping website. This embodiment of the discount display system 1 may enable a system operator to engage in a variety of one-on-one marketing promotions. In this embodiment, the item status triggers for each product offered on the website may also relate to the identity of the customer who accesses the site. For example, an individual customer may be assigned a loyalty rating which may increase over time, thereby increasing the number of products that will be discounted for that particular customer. Alternatively, a customer's previous shopping habits may be tracked by the system such that items the customer purchases frequently remain at full price, while items infrequently purchased may be discounted. The customer data necessary for this embodiment may be collected manually by a system operator, automatically by an ERP system, or by any other process known to those skilled in the art.

In addition to switching the status of individual item identifiers, the mode control module 29 can be operable to switch the entire discount display system 1 between an active mode and an inactive mode. The discount display system 1 may be configured to be switched from active mode to inactive mode, or vice-versa, manually by a system operator. Alternatively, the discount display system 1 may be configured such that the mode control module 29 automatically switches the system from active mode to inactive mode, or vice-versa, based on pre-determined conditions precedent. When configured to switch automatically, the discount display system 1 may monitor at least one system value and compare the system value to i) a pre-determined system activation condition precedent (if the system is switching from inactive mode to active mode), or ii) a pre-determined system deactivation condition precedent (if the system is switching from active mode to inactive mode). The system value monitored may be any of the system values described above. Exemplary embodiments of the active mode and the inactive mode are shown in FIGS. 4a and 4b respectively.

Figure 4A:
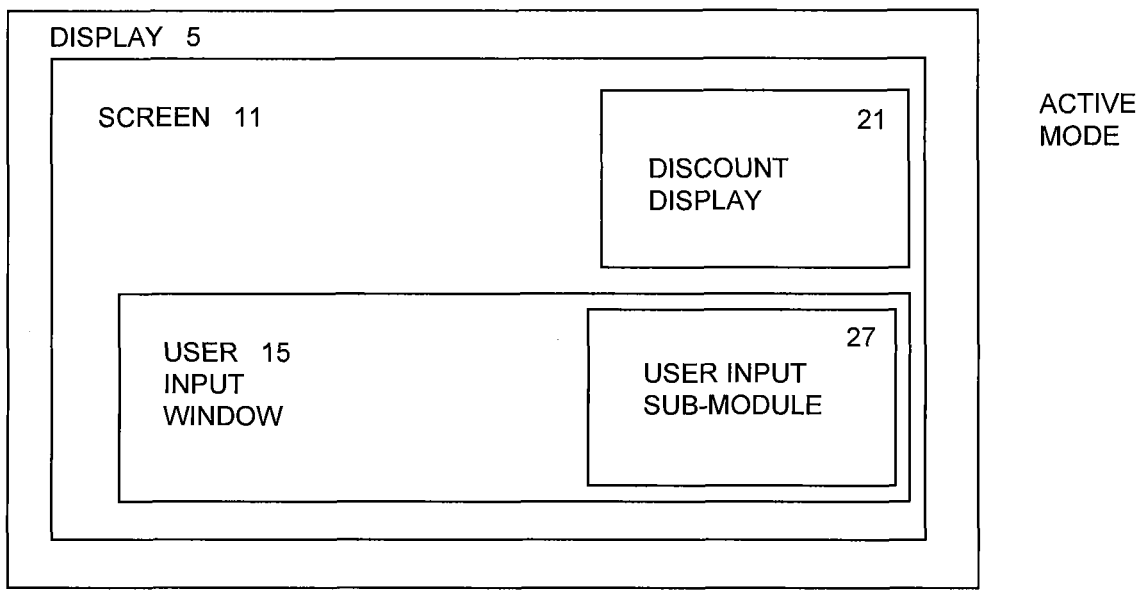
FIG. 4a is an exemplary block diagram illustrating a screen of a discount display system operating in active mode.
Figure 4B:
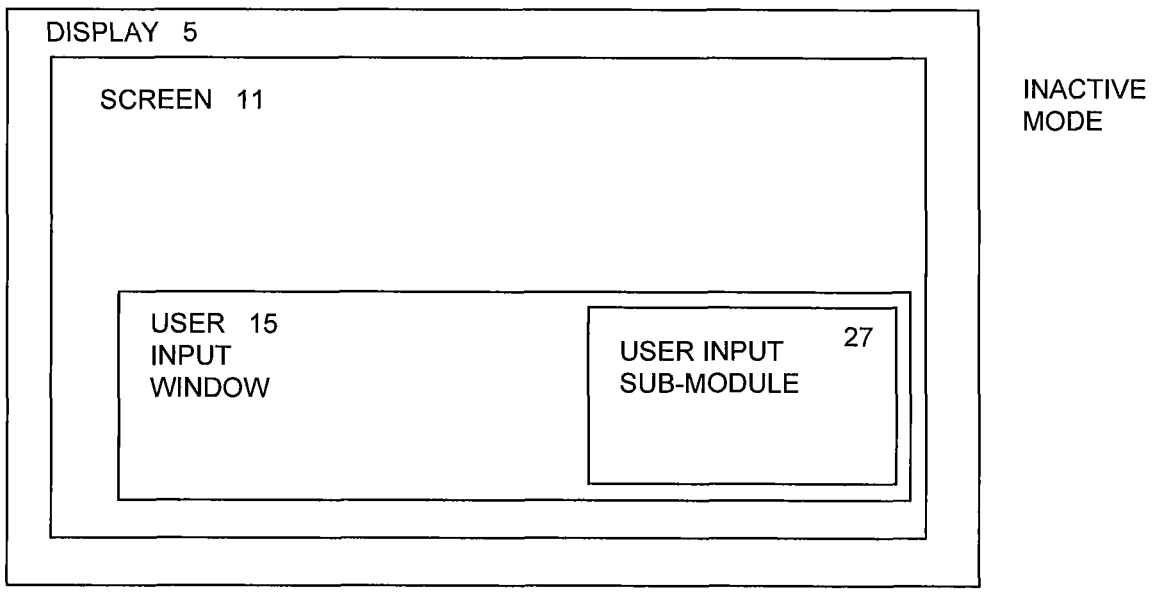
FIG. 4b is an exemplary block diagram illustrating a screen of a discount display system operating in inactive mode.

FIG. 4a shows the display 5 of the discount display system 1 when the system is in active mode. In active mode, the discount display system 1 can include both discount-eligible item identifiers 17 and discount-ineligible item identifiers 31. When the discount display system 1 is in active mode, the screens 11 can include the user input window 15, the user input sub-module 27 and the discount display 21. As described above, the discount display 21 can contain the current discount value available to a user.

The discount display 21 can be configured to display the value of the current discount as a dollar value (e.g. "You will save $5"), as a percentage of the user's check-out total (e.g. "You will save 7%") or both (e.g. "You will save 7% on your purchase. That's $5!"). It is understood that the value of the current discount can be displayed in any terms chosen by the system operator. For example, the discount could be expressed as a percentage of the user's discount-eligible price (the price of only the discount-eligible items selected) or in retailer specific reward points or as free gifts or bonus items.

When the discount display system 1 is in inactive mode, there are no discount-eligible item identifiers 17 and no discount value is applied to a user's purchases. In other words, when the discount display system 1 is operating in inactive mode, the full price of every item selected by a user is added to the user's check-out total without modification or reduction. To operate in inactive mode, the discount display system 1 can be configured such that the mode control module 29 deactivates the discount calculation module and the discount display 21. An embodiment of an inactive mode is shown in FIG. 4b, where the discount display 21 is removed from the plurality of screens 11 such that the discount value is not displayed to the user and no discount is calculated or applied to the user's purchases. Alternatively, when the discount display system 1 is in inactive mode, the mode control module 29 could be configured to fix the discount calculation module 19 to output a discount of zero value. The zero discount could be expressed in a dollar value ("You will save $0") or as a percentage ("You will save 0%"). In this embodiment, the discount display 21 would continue to be displayed to the user and the discount calculation module 29 would still recalculate and display a new discount amount in response to each of the user's item selections, but the updated and displayed value of the discount would remain fixed at zero.

The value of a user's current discount shown in the discount display 21 may begin at a default discount value and can increase or decrease to a pre-determined maximum or minimum value in response to the user's selections. For example, the default discount value may be set at $0.00 and may be operable to increase to a maximum of $10.00 in response to a user's selection of discount-eligible item identifiers 17. Alternatively, the default discount value may be set at 7% of a user's discount eligible purchases and may be operable to increase to a maximum of 15%. In most common applications of the discount display system 1, the maximum discount value will be set at a value that is less than 100% of the regular purchase price of the discount-eligible item identifiers 17 selected. However, it is understood that the maximum and minimum discount values for a user's transaction could be set at any value, including values below 0% (a total price increase) and above 100% (a payout to the user).

Consider the following example of an online shopping website that offers designer clothing for sale. A user may have the option of buying a designer shirt, designer pants, designer socks and designer ties. In order to effectively sell these items, the online shopping website can alert the user to their availability and perhaps communicate some specific information about each item to the user. To this end, the online shopping website can include discount-eligible item identifiers 17 on its purchase option screen 13. In addition, the retailer may have some items, such as designer shoes, available for purchase that are not to be included in the discount calculations. For these items the shopping website can include discount-ineligible item identifiers 31 on its purchase option screen 13. For clothing items, the discount-eligible item identifiers 17 and the discount-ineligible item identifiers 31 may be photographs of the items and may include other information such as the size of the items, the material the items are made from and the price of the items. A user who is interested in buying a shirt can use the user input window 15 to select the discount-eligible item identifier 17 that corresponds to the shirt. The user could also purchase a pair of designer shoes from the website by selecting the discount-ineligible item identifier 31 that corresponds to the designer shoes. The price of the shoes would then be recorded by the price determination module 23 so that the price of the shoes will be included in the user's check-out price total, but because the shoes are discount-ineligible, the price may not be forwarded to the discount calculation module 19. As a result, the selection of the shoes' discount-ineligible item identifier 31 increases the total check-out price the user will pay, but it does not affect the value of the discount offered to the user. After the selection of the shoes, the value of the current discount shown in discount display 21 will remain unchanged.

A user might also purchase the designer socks by using the user input window 15 to select the discount-eligible item identifier 17 that corresponds to the socks. If the user wanted to purchase multiple pairs of socks, she could select the socks' discount-eligible item identifier 17 multiple times. Each selection of the socks' discount-eligible item identifier 17 could relate to a separate pair of real socks to be purchased. Therefore, each selection of the socks' discount-eligible item identifier 17 could be recorded by the price determination module 23, which could send the discount-eligible price of the socks to the discount calculation module 19. The discount calculation module 19 would then recalculate the current discount amount based on each item selection, and output a new, increased, discount amount to the discount display 21.

In addition to being used in the discount calculations, the discount-eligible item identifiers 17 selected for purchase could be grouped in an online "shopping cart" along with the discount-ineligible item identifiers 31 where the user could review her pending selections. The user input sub-module 27 can allow a user to modify her selections. If a user wished to remove an item from her shopping cart she could use the user input sub-module 27 to un-select the discount-eligible item identifier 17 that corresponds to the product she no longer wished to purchase. If an item is removed from the online shopping cart, the price determination module 23 can be operable to reduce the total check-out price by an amount that corresponds to the price of the unselected items. In addition, if the user unselects a discount-eligible item identifier 17, the price determination module 23 can be operable to communicate the discount-eligible price reduction to the discount calculation module 19 as well as reducing the check-out price. In response to this communication of the price reduction from the price determination module 23, the discount calculation module 19 can recalculate the current discount value and send the updated current discount information to the discount display 21. In the preferred embodiment of the discount display system 1, increases in the discount-eligible price will cause the current discount value to increase, whereas decreases in the total discount-eligible price (as a result of unselecting a discount-eligible item identifier for example) will cause the current discount value to decrease.

If the designer clothing website offered a 5% discount on discount-eligible selections, a user selecting a $20.00 discount-eligible shirt for purchase could increase her check-out total price by $20.00 and her current discount could increase to $1.00. If the user then selected three pairs of $10.00 designer socks, her check-out total could increase by $10.00 per selection and her current discount could increase by $0.50 per selection. In the preferred embodiment, the discount calculation module 19 would update the current discount sent to the discount display 21 immediately after each selection—i.e. the user could see her current discount increase to $1.50 after her first sock selection, $2.00 after her second selection and $2.50 after her third selection. When the user selects the discount-ineligible item identifier 31 corresponding to the $50.00 designer shoes, her check-out total may increase by $50.00 but the current discount shown in the discount display 21 may remain unchanged. The user could then check her online shopping cart and review her selections totaling $100.00 with a discount of $2.50. If the user then decided to only purchase two pairs of socks, the user could use the user input sub-module 27 to unselect one pair of socks. As a result of the un-selection, her check-out total could decrease to $90.00 and her current discount amount could decrease by $0.50 and could be re-displayed by the discount display as $2.00. After all the user selections are finalized, the user could proceed to a check-out screen to enter payment information and complete the transaction.

Alternatively, the designer clothing website could offer an initial discount of 5% that increased in response to a user's selection of discount-eligible item identifiers 17 over, say, some initial amount. For example, the initial discount available to a user could be set at 5% for a user's initial item selection valued at less than $20.00, and then the current discount available to a user could increase by 0.1% for every $10.00 of discount-eligible item identifiers 17 selected over this $20.00 threshold. In this alternative embodiment of the discount display system 1, a user's first selection of a $20.00 discount-eligible shirt for purchase could increase her check-out total price and her discount-eligible total price from $0.00 to $20.00 and her current discount could increase from $0.00 to $1.00 based on the 5% initial discount. If the user then selected three pairs of $10.00 designer socks, her check-out total could increase by $10.00 per selection and the value of her current discount could increase. However, instead of her current discount increasing by $0.50 per selection as in the example above, her current discount rate itself could increase by 0.1% per selection and the newly increased current discount value could then be applied to the newly selected socks as well as to all discount-eligible items previously selected during the current transaction. Therefore, after her first selection of the socks discount-eligible item identifier 17, her check-out total could increase to $30.00, her current discount amount would increase to 5.1% and the value of her current discount would be $1.53 (5.1% of $30.00). After the first sock selection, the discount calculation module could calculate the increased current discount and the discount display 21 could be updated to show the user her increased savings ("You will now save 5.1%" or "You will now save $1.53" or "You will now save 5.1%, which is $1.53" as described above). When the user selects the second pair of socks for purchase, her check-out total price and her discount-eligible total price could increase by $10.00 to $40.00 and her current discount could increase from 5.1% to 5.2% which could be applied to her entire discount-eligible total price. The discount display 21 could then be updated to display her new current discount as 5.2% and/or as $2.08 (5.2% of $40.00). Encouraged by her increased savings, the user could then select her third pair of socks for purchase. The current discount could increase by 0.1% to 5.3% and the check-out total price and her discount-eligible total price could increase by $10.00 to $50.00. The user's current discount would then be $2.65 (5.3% of $50.00) as opposed to $2.50 (5% of $50.00) in the constant discount example above. If the user also chose to purchase the $50.00 discount-ineligible shoes described above, her check-out total price could increase to $100.00, her discount-eligible total price would remain unchanged at $50.00 and therefore her current discount amount would remain unchanged at 5.3% of the discount-eligible total price which is $2.65. When the user chooses to complete her transaction, the current discount may be deducted from the $100.00 check-out total price, reducing the payment required from the user to $97.35. Alternatively, the price determination module could be operable to deduct the current discount from the $50.00 discount-eligible total price reducing the discount-eligible total price to $47.35. The reduced discount-eligible total price could then be added to the $50.00 discount-ineligible price to arrive at the same check-out total price of $97.35.

In yet another embodiment of the discount display system 1, the discount calculation module 19 could be operable to increase the 5% initial discount by 0.1% for every discount-eligible $10.00 spent by the user, as opposed to only increasing by 0.1% for each discount-eligible $10.00 spent after an initial item selection or after over $20.00 worth of discount-eligible selection. For example, the user's first selection of the $20.00 discount-eligible shirt could increase the discount by an additional 0.2% above the 5% initial discount. In this example, the user's discount-eligible total price and check-out total price could be increased to $20.00 and her current discount would be 5.2% of $20.00 or $1.04. If the user made the same purchases as described above using the current embodiment of the discount display system 1, she would end her selections with a check-out total price $100.00, a discount-eligible total price of $50.00 and a current discount of 5.5% of her discount-eligible total price which equals $2.75 (as opposed to $2.50 in the first example and $2.65 in the second example above).

The scenarios above have provided examples of three possible current discount calculation options that could be implemented by an online retailer using the discount display system 1. The above examples are merely illustrative of possible embodiments of the discount display system 1 and are not intended to provide an exhaustive listing of all possible means of calculating a current discount amount. The precise mechanism used to calculate the current discount amount (for example fixed percentage, fixed dollar amount, variable percentage, variable dollar amount, etc.) can be selected by discount display system operators based on their individual requirements.

Figure 5:
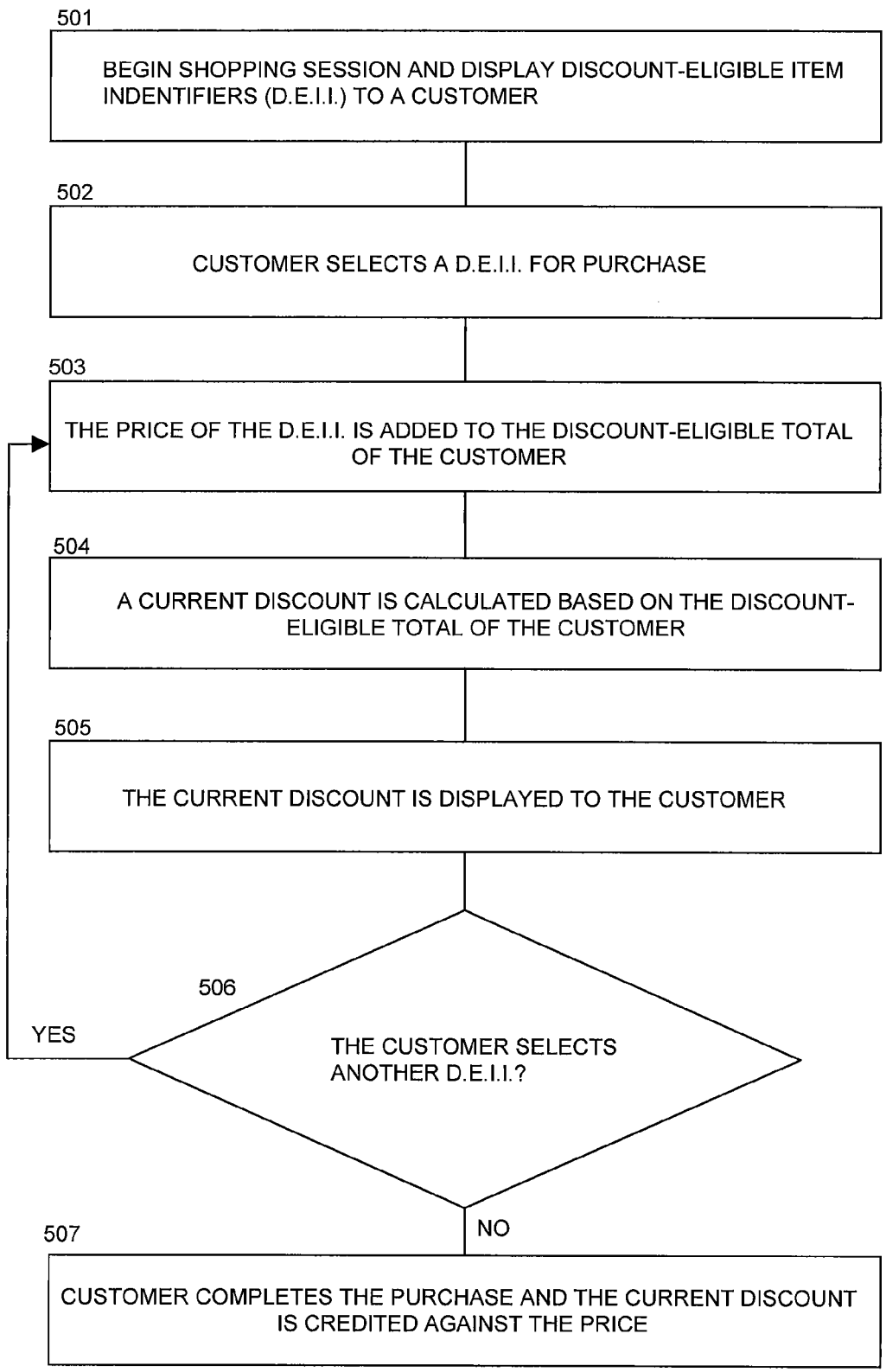
FIG. 5 is a flow chart illustrating an exemplary methodology for using the discount display system.
Figure 6:
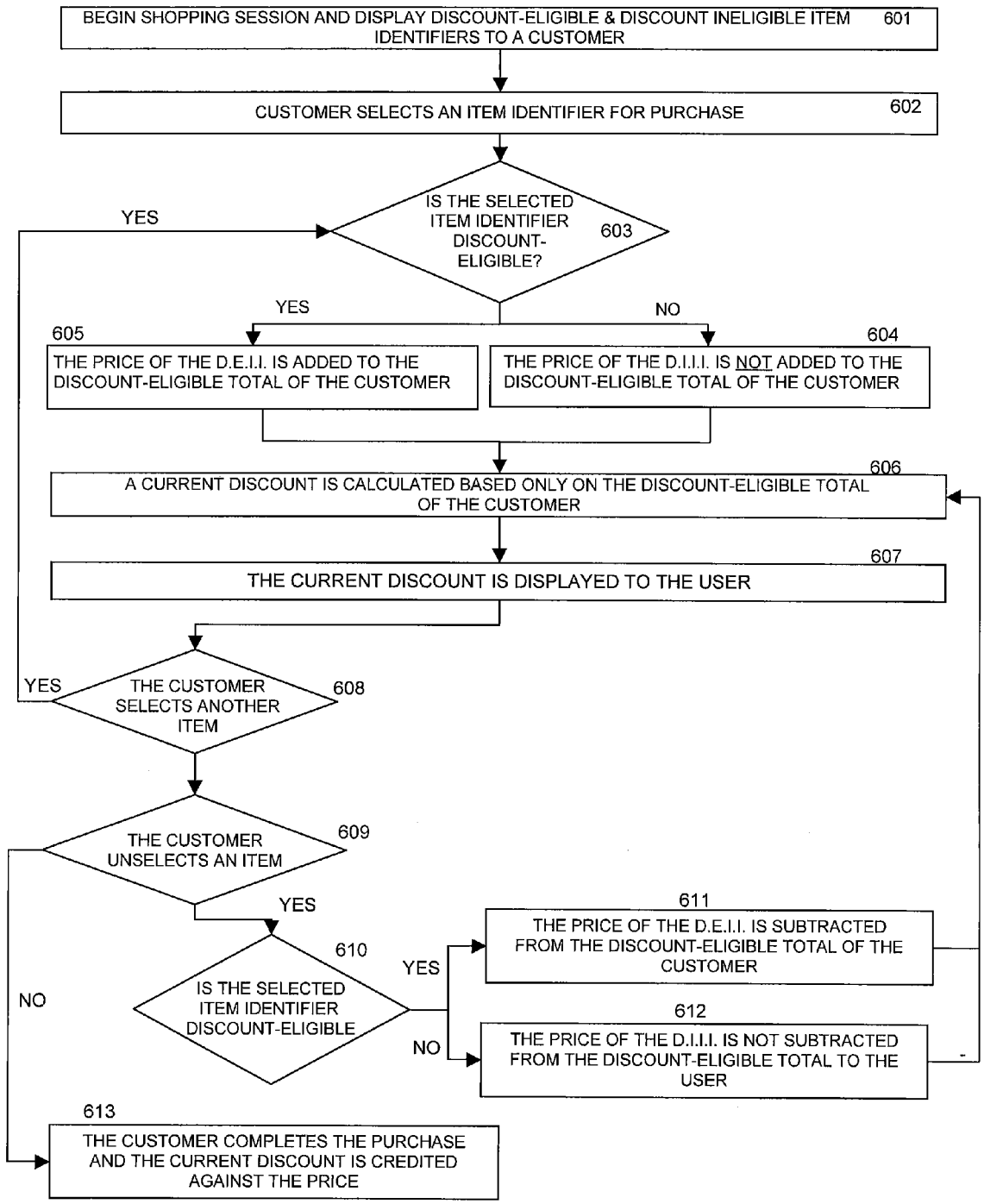
FIG. 6 is a flow chart illustrating an alternative methodology for using the discount display system.

FIGS. 5 and 6 show flow charts illustrating exemplary methods of using the discount display system 1 described in FIG. 1 through FIG. 4b. Each flow chart illustrates steps in a method as well as queries made by the system. Steps are represented by rectangular elements, whereas queries are represented by diamond shaped elements. The steps of the methods are automatically completed by the discount display system 1 in the predetermined sequence indicated on the flow charts. In contrast, the queries can require a decision to be made in response to a query by a component of the discount display system 1 or by a user. Based on the response received from the user or the system component, the queries can alter the course of the method.

In step 501, of method 500 shown in FIG. 5, a customer initiates a shopping transaction on an online shopping website by creating a new online shopping cart as described above. The online shopping cart created by the customer can be operable to store a record of the customer's purchase selections. When initiating a shopping transaction in step 501, the discount display system 1 can display a plurality of discount-eligible item identifiers 17 and a pre-defined current discount value to the user. As discussed above, the value of the pre-defined discount can be determined by a system operator or can be automatically set by the mode control module 29 in response to monitored system values.

In step 502, the discount display system 1 records any discount-eligible item identifiers 17 selected for purchase by the customer. When a selection is recorded, method 500 proceeds to step 503 in which the price of the discount-eligible item identifier 17 selected is added to the discount-eligible total price associated with the customer's shopping session. Changes in the discount-eligible total price are sent to the discount calculation module 19. In step 504, an updated current discount is calculated by the discount calculation module 19, based on the discount-eligible total price. Once the current discount is calculated in step 504, method 500 proceeds to step 505 in which the current discount is displayed to the customer by the discount display 21.

While the current discount is being displayed by the discount display 21, the customer may wish to continue shopping. In query 506, the discount display system 1 determines whether the customer selects an additional item for purchase. If an additional item is selected, method 500 returns to step 502. If an additional item is not selected, method 500 proceeds to step 507. In step 507, the customer has decided to finalize the shopping transaction. The total price of all the items selected for purchase can be calculated, and the value of the current discount can be deducted from the amount owed by the customer. When the customer enters the necessary payment information, the shopping session can be concluded.

Method 500 is provided to illustrate a simple embodiment of the discount display system 1. It is understood that other embodiments of the discount display system 1 may include additional functionality not shown in FIG. 5. One example of an alternate embodiment of the discount display system 1 is described below with reference to FIG. 6.

FIG. 6 shows another embodiment of a flow chart illustrating a method of using the discount display system 1. In step 601, a transaction can be started for a user. The transaction may be started by opening an electronic shopping cart as in FIG. 5 or by any other process known to those skilled in the art of online shopping websites. Once the transaction has been initiated, the price determination module 23 can track any item identifiers added to the user's shopping cart by the user in step 602. If an item identifier is added to the cart, the method proceeds to query 603 in which the price determination module 23 distinguishes which item identifiers in the cart are discount-eligible item identifiers 17 and which item identifiers are discount-ineligible item identifiers 31. As a result of query 603, if an item is discount-ineligible, the method proceeds to step 604 where information about the discount-ineligible item identifier may be recorded, but the discount-ineligible price information may not be directed to the discount calculation module 19. If, however, an item is discount-eligible, the result of query 603 is that the method proceeds to step 605 wherein the price of the discount-eligible item identifier selected can be recorded. From either step 604 or step 605, the method proceeds to step 606 where a current discount can be calculated based on the discount-eligible total of the customer. As discussed above, the discount calculation of step 606 can be performed by the discount calculation module 19 or it can be performed by an external calculation by the shopping website.

After the discount calculation of step 606, the method proceeds to step 607 in which the current discount is displayed to the customer via the discount display 21. If the discount calculation of step 606 was performed by an external component, in step 607 the discount calculation module 19 may serve as a routing device to route the external discount calculation to the discount display 21 where the current discount value is displayed to the user. Once the current discount has been displayed to the customer in step 607, the discount display system 1 queries the customer, via query 608, to determine if the customer is going to select an additional item for purchase. If an additional item is selected, the method 600 returns to query 603. If, however, an additional item is not selected, the method 600 proceeds to query 609 in which the system determines if the customer unselects an item from the shopping cart.

If an item is unselected in query 609, the method 600 proceeds to query 610. In query 610 the discount display system 1 determines if the item removed from the shopping cart was a discount-eligible item or a discount-ineligible item. If the item unselected was a discount-eligible item, the method 600 proceeds to step 611 in which the price of the discount-eligible item unselected can be subtracted from the customer's discount-eligible total. The method 600 then returns to step 606 where a new current discount value can be calculated. Alternatively, if the item unselected was a discount-ineligible item, the method 600 proceeds to step 612. In step 612 the price of the discount-ineligible item unselected may not be deducted from the customer's discount-eligible total, although it may be deducted from the customer's checkout total. From step 612, the method 600 returns to step 606.

If an item was not unselected in query 609, the method 600 proceeds to step 613 in which the customer's purchase selections are finalized. The prices of all items selected for purchase are totaled, and the current discount may be deducted from the price owed by the customer. In order to conclude method 600 in step 613, the customer submits payment information, thereby ending the shopping session.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. In particular, this innovation described herein could be applied to a wide variety of display media in addition to a primarily retail application; for example, mobile point of sale devices, retail point of sale display systems or in an audio or other multimedia display format.

The invention claimed is:

1. A discount display system comprising:
   a processor;
   a display; and,
   a memory including a program for configuring the processor to provide
      a plurality of screens for displaying information via the display, wherein i) the display is switchable to display different screens in the plurality of screens, ii) the plurality of screens comprises a plurality of purchase option screens for displaying a plurality of discount-eligible item identifiers that represent a plurality of discount-eligible items for purchase, and iii) each purchase option screen in the plurality of purchase option screens comprises a user input window operable by a viewer of the purchase option screen to select an associated discount-eligible item identifier for purchase;
      a price determination module for determining a price associated with each of the at least one discount-eligible item identifiers;
      a discount calculation module configured to calculate a current discount based on the price associated with each of the discount-eligible item identifiers selected for purchase, wherein the discount calculation module is configured to recalculate the current discount after each purchase item identifier is selected for purchase; and,
      a discount display for displaying only the current discount and for updating the current discount displayed when the discount calculation module recalculates the current discount, the discount display being included in each screen in the plurality of screens.

2. The system as defined in claim 1 wherein, after each discount-eligible item identifier is selected and before switching the display from the purchase option screen used to select the item for purchase, the discount calculation module is configured to automatically re-calculate the current discount; and the discount display is configured to automatically update the current discount displayed.

3. The system as defined in claim 2 wherein the discount calculation module is configured to re-calculate the current discount within five seconds of each discount-eligible item identifier being selected; and the discount display is configured to update the current discount displayed.

4. The system as defined in claim 1 further comprising at least one discount-ineligible item identifier that represents at least one discount-ineligible item available for purchase, wherein
the price determination module is further operable to determine a price associated with each of the at least one discount-ineligible item and to calculate a check-out total price based on the associated price for each of the discount-eligible item identifiers and discount-ineligible item identifiers selected by the user.

5. The system as defined in claim 1, wherein the discount display displays the current discount as at least one of a dollar value and a percentage of the price.

6. A discount display system comprising:
a processor;
a display; and,
a memory including a program for configuring the processor to provide
a plurality of screens for displaying information via the display, wherein i) the display is switchable to display different screens in the plurality of screens, ii) the plurality of screens comprises a plurality of purchase option screens for displaying a plurality of discount-eligible item identifiers that represent a plurality of discount-eligible items for purchase, and iii) each purchase option screen in the plurality of purchase option screens comprises a user input window operable by a viewer of the purchase option screen to select an associated discount-eligible item identifier for purchase;
a price determination module for determining a price associated with each of the at least one discount-eligible item identifiers;
a discount calculation module configured to calculate a current discount based on the price associated with each of the discount-eligible item identifiers selected for purchase, wherein the discount calculation module is configured to recalculate the current discount after each purchase item identifier is selected for purchase; and,
a discount display for displaying the current discount and for updating the current discount displayed when the discount calculation module recalculates the current discount, the discount display being included in each screen in the plurality of screens;
wherein the discount display displays the current discount as a percentage of the price.

7. The system as defined in claim 1 further comprising a server for providing a website to provide the plurality of screens, wherein the server is accessible over the internet to display the plurality of screens on the display at a location geographically remote from the server.

8. The system as defined in claim 7 wherein
the system further comprises a user input sub-module for unselecting a discount-eligible purchase item identifier previously selected for purchase;
after unselection of the discount-eligible purchase item identifier, the discount calculation module is configured to re-calculate the current discount; and
after re-calculation of the current discount, the discount display is configured to update the current discount displayed.

9. The system as defined in claim 8 wherein
after selection of the discount-eligible purchase item identifier, the discount calculation module is configured to re-calculate the current discount to increase the current discount; and,
after unselection of the discount-eligible purchase item identifier, the discount calculation module is configured to re-calculate the current discount to reduce the current discount.

10. The system as defined in claim 1 further comprising a mode control module for switching the system between an active mode and an inactive mode, such that i) in the active mode, the discount display displays the current discount as calculated by the discount calculation module, and ii) in the inactive mode, the current discount equals zero.

11. The system as defined in claim 10, wherein the mode control module is configured i) to monitor at least one system value and to automatically switch the system from the active mode to the inactive mode when the at least one system value corresponds to at least one system deactivation condition precedent stored within the mode control module; and, ii) to monitor the at least one system value and to automatically switch the system to the active mode from the inactive mode when the at least one system value corresponds to at least one system activation condition precedent stored within the mode control module.

12. The system as defined in claim 11, wherein
the at least one system value monitored by the mode control module comprises at least one of time and date, system inventory levels, and promotional offer indicators;
the at least one system deactivation condition precedent comprises at least one of inactive mode starting times and dates, minimum inventory level values and promotional offer indicators; and,
the at least one system activation condition precedent comprises at least one of active mode starting times and dates, maximum inventory level values and promotional offer indicators.

13. The system as defined in claim 1, further comprising at least one discount-ineligible item identifier having an associated price, wherein the at least one discount-ineligible item identifier represents at least one discount-ineligible item available to be purchased, wherein
the discount calculation module is configured to leave the current discount unchanged when a discount-ineligible item identifier is selected for purchase.

14. The system as defined in claim 13 further comprising a mode control module for changing i) a discount-ineligible item to a discount-eligible item, and ii) a discount-eligible item to a discount-ineligible item.

15. The system as defined in claim 14, wherein the mode control module is configured to monitor at least one item-specific value and to automatically convert i) a discount-ineligible item to a discount-eligible item when the at least one system value corresponds to at least one item-specific activation condition precedent stored within the mode control module, and ii) a discount-eligible item to a discount-ineligible item, when the at least one system value corresponds to at least one item-specific deactivation condition precedent stored within the mode control module.

16. The system as defined in claim 15, wherein
the at least one item-specific value monitored by the mode control module comprises at least one of time and date, item-specific inventory level and item-specific promotional offer indicator;
the at least one item-specific deactivation condition precedent comprises at least one of item-specific active mode starting times and dates, item-specific minimum inventory level values and item-specific promotional offer indicators; and, the at least one item-specific activation condition precedent comprises at least one of inactive mode starting times and dates, item-specific maximum inventory level values and item-specific promotional offer indicators.

17. A method for displaying a discount on a discount display system comprising a processor and a display, the method comprising:
- a) displaying a plurality of purchase option screens to a customer on the display;
- b) displaying a plurality of discount-eligible item identifiers to the customer on the plurality of purchase option screens, wherein each discount-eligible item identifier represents a discount-eligible product available for purchase;
- c) for each discount-eligible item identifier selected by a customer i) recording the discount-eligible item identifier selected, ii) determining a price associated with the customer selected discount-eligible item identifier using the processor, iii) adjusting a current discount value for the customer transaction using the processor based on the associated price of the selected discount-eligible item identifier;
- d) displaying only the current discount value to the customer in a discount display on the plurality of purchase option screens, as at least one of a dollar value or a percentage of the total price, after each discount-eligible item identifier is selected for purchase; and
- e) repeating c) and d) for each discount-eligible item identifier selected for purchase.

18. The method of claim 17, wherein the adjusted current discount value is displayed before switching the display from the purchase option screen used to select or unselect the discount-eligible item for purchase.

19. The method of claim 17, wherein b) further comprises displaying a plurality of discount-ineligible item identifiers to the customer wherein each discount-ineligible item identifier represents a discount-ineligible product available for purchase, and selection of the customer selected discount-ineligible item identifier leaves the current discount value unchanged.

20. The method of claim 19, wherein the discount display system can be switched from an active mode, in which a current display is calculated and displayed, to an inactive mode, in which the current discount equals zero; and the system can be switched from the active to the inactive mode, or the inactive to the active mode, automatically in response to predetermined system conditions precedent.

* * * * *